United States Patent [19]
Sakane et al.

[11] Patent Number: 5,765,877
[45] Date of Patent: Jun. 16, 1998

[54] PIPE JOINT

[75] Inventors: Hideto Sakane; Hisayuki Yagi, both of Saitama; Nobuyuki Okuda; Makoto Saito, both of Tochigi; Koichi Inoue, Ibaraki, all of Japan

[73] Assignee: Honda Giken Kogyo Kabushiki Kaisha, Tokyo, Japan

[21] Appl. No.: 488,022

[22] Filed: Jun. 7, 1995

[30] Foreign Application Priority Data

Jan. 27, 1995 [JP] Japan .................................. 7-011235
Jan. 29, 1995 [JP] Japan .................................. 7-011233

[51] Int. Cl.$^6$ ................................................ F16L 35/00
[52] U.S. Cl. ........................ 285/93; 285/305; 285/914; 285/319
[58] Field of Search ...................... 285/93, 305, 914, 285/319

[56] References Cited

U.S. PATENT DOCUMENTS

| | | |
|---|---|---|
| 3,314,696 | 4/1967 | Ferguson et al. |
| 3,534,988 | 10/1970 | Lindsey et al. |
| 4,244,608 | 1/1981 | Stuemky |
| 4,423,892 | 1/1984 | Bartholomew |
| 4,524,995 | 6/1985 | Bartholomew |
| 4,601,497 | 7/1986 | Bartholomew |
| 4,691,943 | 9/1987 | Deland et al. |
| 4,875,709 | 10/1989 | Carroll et al. |
| 4,889,368 | 12/1989 | Laipply |
| 5,211,427 | 5/1993 | Washizu |

FOREIGN PATENT DOCUMENTS

| | | | |
|---|---|---|---|
| 0 530 778 | 9/1992 | European Pat. Off. | |
| 593937 | 4/1994 | European Pat. Off. | 285/305 |
| 2 307 154 | 8/1974 | Germany | |
| 51-2734 | 1/1976 | Japan | |
| 206197 | 8/1989 | Japan | 285/305 |

*Primary Examiner*—Dave W. Arola
*Attorney, Agent, or Firm*—Armstrong, Westerman, Hattori, McLeland & Naughton

[57] ABSTRACT

A pipe joint comprises a pipe formed with an annular projection on a connection end portion thereof, a member having a socket including a cylindrical portion for receiving the pipe therein and formed with apertures in the cylindrical portion, and a resilient stopper having circular-arc ridges fittable in the respective apertures of the socket to project radially inward. The stopper extends axially of the pipe and has portions which, when the stopper is mounted on the cylindrical portion of the socket, are beyond 180° from the direction of mounting and at least have a circular-arc form to extend along the outer periphery of the cylindrical portion. The stopper further has an assembling error preventing flange that cooperates with a protrusion preventing erroneous installation of the stopper in the socket.

14 Claims, 11 Drawing Sheets

PIPE JOINT

BACKGROUND OF THE INVENTION

The present invention relates to pipe joints for use in piping for motor vehicle air conditioner condensers, evaporators and like heat exchangers, compressor hoses, receivers and like tanks. The invention has application also to joints which are used under conditions not exceeding those for motor vehicle air conditioners with respect to pressure and temperature.

The invention relates also to an assembling error preventing structure of the stopper to be incorporated into the pipe joint.

The present applicant has already proposed the pipe joint described below in Japanese Patent Application No. 53591/1994.

Figure 30:
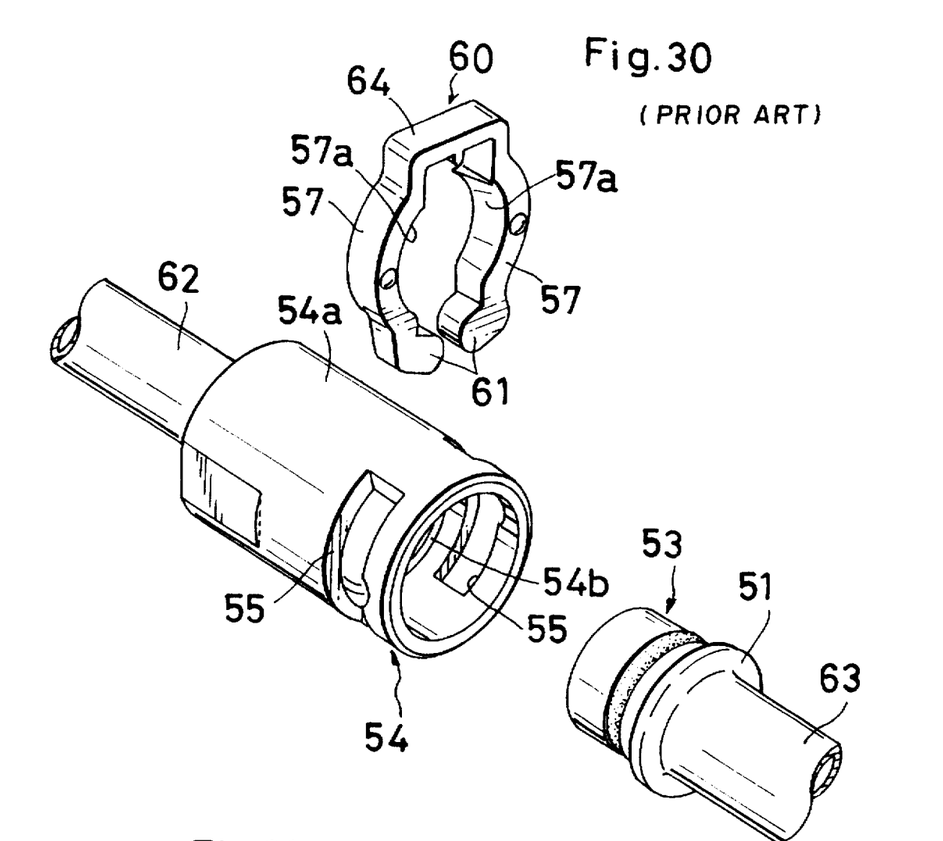
FIG. 30 is a perspective view showing a conventional pipe joint.
Figure 31:
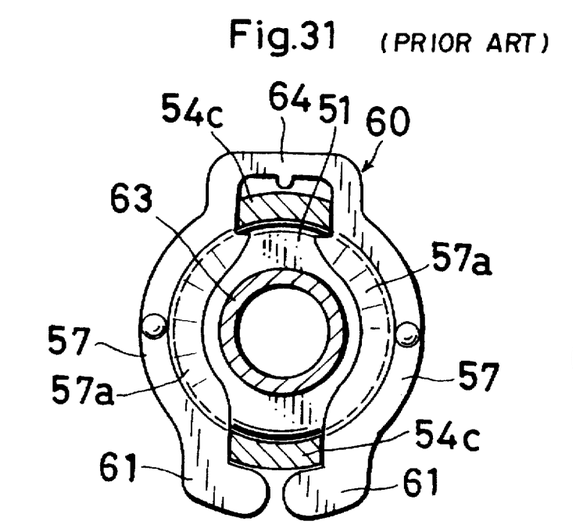
FIG. 31 is a view in vertical section showing the conventional prior art joint as used for joining pipes.

With reference to FIGS. 30 and 31, the previously proposed pipe joint comprises a cylindrical spigot 53 formed with an annular projection 51 on the outer periphery of its base end portion, a cylindrical socket 54 having two opposed apertures 55 formed in its peripheral wall 54a and positioned close to the forward end thereof and a bearing portion 54b provided on the inner surface of the wall 54a at the base end thereof for the annular projection 51 of the spigot 53 to bear on, and a stopper 60 having two circular-arc resilient legs 57 fittable in the respective apertures 55 from outside to project radially inward and having their curving-in faces opposed to each other, the inner face of each leg 57 being in the form of a slope 57a. The legs 57 of the stopper 60 are fitted into the respective apertures 55 of the socket 54 with the slopes 57a of the legs 57 facing the spigot side of a pipe, and the spigot 53 is inserted into the socket 54 until the annular projection 51 moves past the legs 57, whereby the annular projection 51 of the spigot 53 is fixedly held between the inner bearing portion 54b of the socket 54 and the legs 57 of the stopper 60. The spigot 53 and the socket 54 are provided at the respective connection ends of two pipes 62, 63 to be joined. Each leg 57 of the stopper 60 has an inward L-shaped bent portion 61 at its free end.

Figure 32:
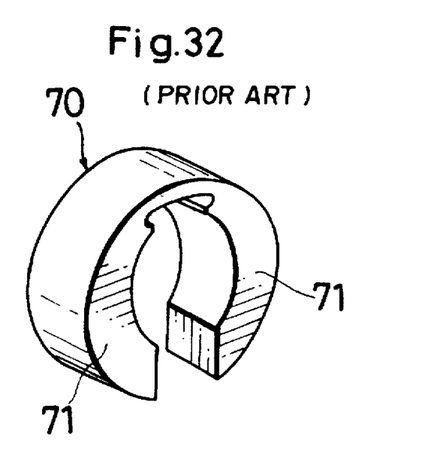
FIG. 32 is a perspective view showing a different prior art conventional stopper.
Figures 33, 35:
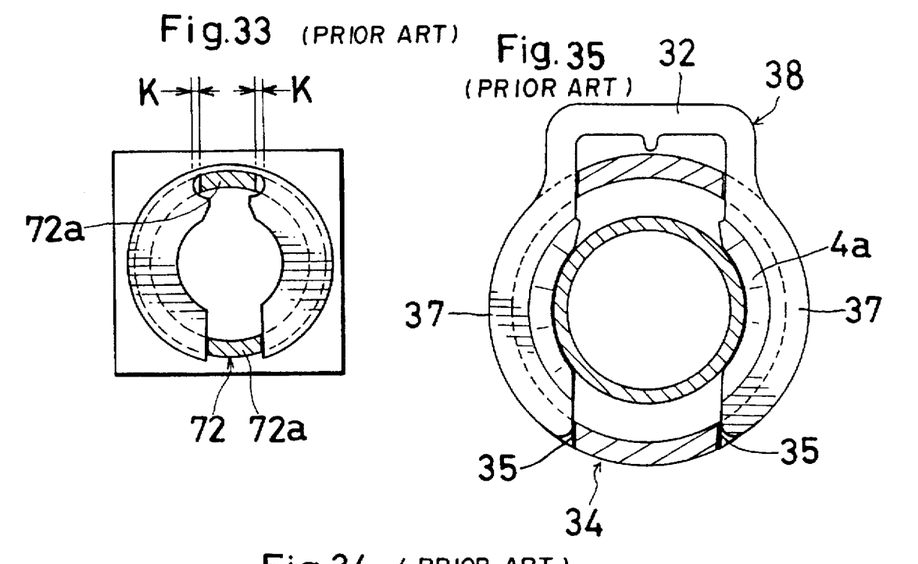
FIG. 33 is a view in vertical section and showing the prior art stopper of FIG. 32 as mounted in place.
FIG. 35 is a view in vertical section and showing the prior art pipe joint of FIG. 34 as used for joining pipes.

FIGS. 32 and 33 show another stopper 70 for use in pipe joints which consists only of two opposed circular-arc resilient legs 71 and which is fittable in a socket 72.

In the case of the pipe joint shown in FIGS. 30 and 31, each circular-arc resilient leg 57 of the stopper 60 has the inward L-shaped bent portion 61 at its free end, so that when the stopper 60 is to be mounted on the socket 54, the opposed legs 57 need to be greatly moved away from each other.

Further with the pipe joint described, tensile stress of the pipe will act concentrically on the head 64 of the stopper between the legs 57.

In the case of the pipe joint shown in FIGS. 32 and 33, on the other hand, the stopper 70 has small allowances K for engagement with a bridge portion 72a of the socket 72.

Figure 34:
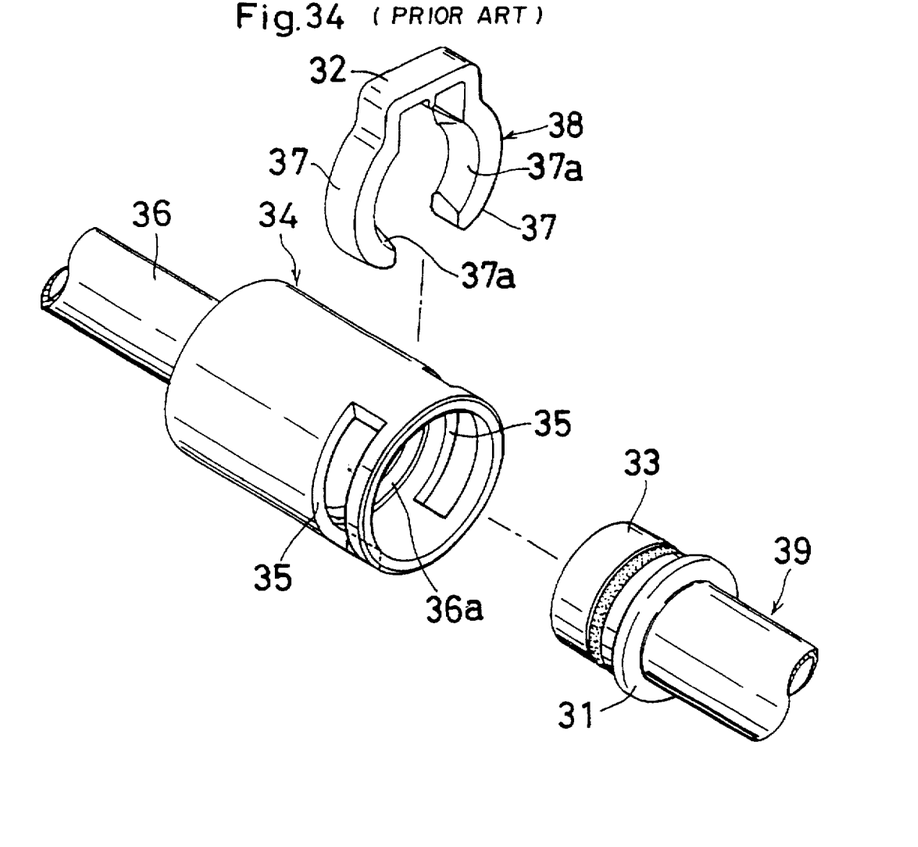
FIG. 34 is a perspective view of another example of conventional prior art pipe joint.

FIGS. 34 and 35 show another pipe joint proposed by the present applicant (Japanese Patent Application No. 254990/1992). Indicated at 34 in these drawings is a socket of aluminum (including an alloy thereof), at 38 a stopper of synthetic resin, and at 39 an aluminum pipe.

The stopper 38 comprises a channel-shaped head 32, and a pair of circular-arc resilient legs 37 extending from opposed ends of the head in an arcuate form.

With the pipe joint of FIGS. 34 and 35 as is the case with the pipe joint previously described, the forward end of the pipe 39, when inserted into the socket 34, is guided by slopes 37a of the stopper 38 and advances into the space between the legs 37 while causing the two legs 37 to resiliently move away from each other. When the pipe 39 is pushed in until the annular projection 31 of the pipe 39 moves past the legs 37, the legs 37, return toward each other by virtue of their resiliency, with the result that the annular projection 31 of the pipe 39 fits in a space between a flange 36a of an aluminum pipe 36 and the legs 37 of the stopper 38, whereby the pipe 39 is completely joined to the socket 34.

However, the pipe joint described has the following drawback. For the forward end of the pipe 39 to be smoothly guided by the pair of legs 37, 37 for connection, the stopper 38 must be mounted on the socket 34 with its slopes 37a oriented toward the pipe to be inserted, whereas the stopper 38 is also mountable in place with the slopes 37a oriented in the opposite direction in error.

OBJECTS AND SUMMARY OF THE INVENTION

An object of the present invention is to provide a pipe joint wherein the stopper is easily mountable on the socket and can be held in place with good stability after mounting.

The present invention provides a pipe joint which comprises a pipe formed with an annular projection on a connection end portion thereof, a socket having a cylindrical portion for receiving the pipe therein, and a stopper having circular-arc ridges fittable in respective apertures in the cylindrical portion. The stopper has an embracing portion extending axially of the pipe and so shaped that when the stopper is mounted on the cylindrical portion of the socket, parts of the embracing portion which are beyond 180° from the direction of mounting are at least in a circular-arc form to extend along the outer periphery of the cylindrical portion. The stopper is usually C-shaped.

The apertures of the socket are usually two in number and are formed as opposed to each other in its peripheral wall. In corresponding relation with the apertures, the circular-arc ridges of the stopper are two in number and are formed on the inner surface of the embracing portion.

When the stopper is mounted on the socket with the circular-arc ridges fitted in the respective apertures of the socket, the cylindrical portion of the socket is embraced by the embracing portion of the stopper, so that the stopper can be mounted on the socket around its outer periphery with good stability. In the case where the stopper is subjected to a force acting to open the stopper, the force is distributed over the entire stopper. Further when the stopper is mounted on the cylindrical portion of the socket, the circular-arc parts extending beyond 180° from the mounting direction are in engagement with the socket. Accordingly, the stopper is difficult to open; is held engaged with the outer surface of the socket; and is, therefore, reliably prevented from slipping off.

The embracing portion of the stopper, when C-shaped, embraces the cylindrical portion of the socket substantially over the entire circumference thereof. Consequently, the stopper can be mounted around the socket with higher stability.

Another object of the present invention is to provide an assembling error preventing structure for the stopper of the pipe joint.

According to the invention, the circular-arc ridges of the stopper have a slope for guiding the annular projection of the spigot, and an engaging face for holding the annular projection in engagement therewith. The stopper ridges are provided with an assembling error-preventing flange on the pipe insertion side thereof or on the opposite side. If an attempt is made to mount the stopper on the socket with the slopes of the ridges facing toward the opposite side to the pipe insertion side, the error-preventing flange comes into contact with a protrusion provided at a required position on the outer surface of the socket.

DESCRIPTION OF THE PREFERRED EMBODIMENTS

Pipe joints embodying the invention will be described with reference to the embodiments.

Referring to FIGS. 1 to 7, the pipe joint shown comprises a cylindrical spigot 3 formed with an annular projection 1 on the outer periphery of a base end portion thereof; a socket 4 having a cylindrical portion 4A which is formed with two opposed apertures 5 in its peripheral wall 4a toward the outer end thereof, the socket 4 further having a bearing portion 4b formed on its inner surface and positioned closer to the base end thereof than the apertures 5 for the annular projection 1 of the spigot 3 to bear on; and a resilient stopper 10 which has a C-shaped embracing portion 10a for embracing the cylindrical portion 4A of the socket 4 and two opposed circular-arc ridges 7a formed on the inner surface of the embracing portion 10a and fittable in the respective apertures 5 of the socket 4. Each aperture 5 of the socket 4 has two sides 5a, 5b perpendicular to the axis of the socket. The embracing portion 10a of the stopper 10 extends axially of a pipe. The ridges 7a of the stopper 10 have a slope 7b on the pipe insertion side thereof for receiving the spigot 3, and an engaging face 7d on the other side thereof opposite to the slope 7b for engaging the annular projection 1 after the spigot 3 is inserted into the socket. The ridges 7a of the stopper 10 are fitted in the respective apertures 5 of the socket 4 with their slopes 7b facing toward the pipe to be inserted, and the spigot 3 is then inserted into the socket 4 until the annular projection 1 moves past the circular-arc ridges 7a, whereby the annular projection 1 of the spigot 3 is fixedly held between the inner bearing portion 4b of the socket 4 and engaging faces 7d of the ridges 7a.

Figure 1:
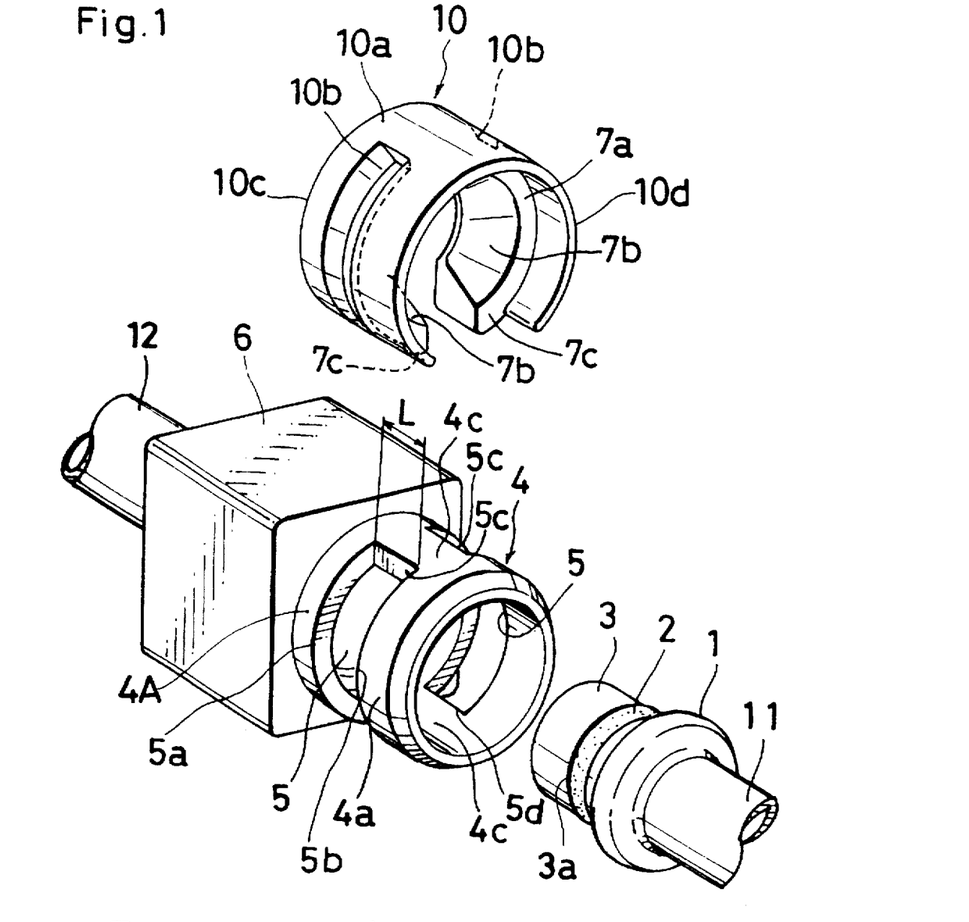
FIG. 1 is a perspective view showing a pipe joint embodying the invention.
Figure 2:
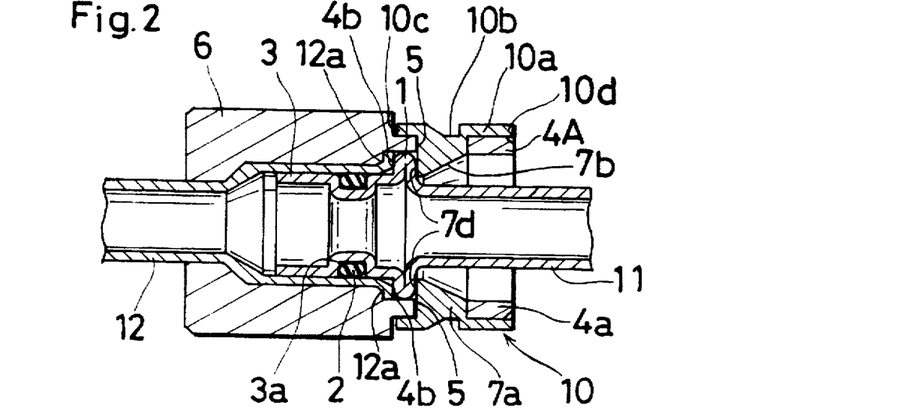
FIG. 2 is a view in horizontal section showing two pipes as joined to each other.
Figure 3:
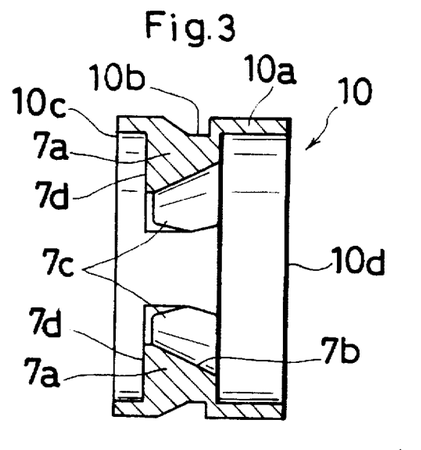
FIG. 3 is a view in horizontal section of a stopper.
Figure 4:
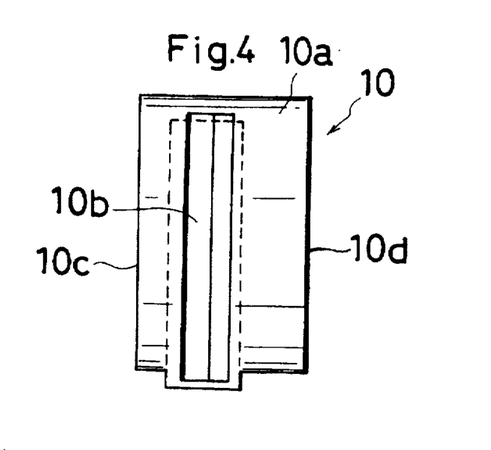
FIG. 4 is a front view of the stopper.

The spigot 3 is provided at the connection end of the pipe 11 to be joined, and the socket 4 is provided at the connection end of the other pipe 12 to be joined to the pipe 11.

The ridge 7a has an extension 7c projecting beyond each end of the embracing portion 10a of the stopper 10. Thus, each end portion of the embracing portion 10a is shorter than the end portion of the ridge 7a toward the fitting direction thereof. The ridge 7a has an engaging portion 7e at the other end thereof opposite to the extension 7c.

Indicated at 2 is an O-ring fitted in a groove 3a of the spigot 3.

With the present embodiment, the stopper 10 is made of a fiber reinforced plastic comprising a mixture of nylon 66 and nylon 610 as a matrix and glass fiber as a filler. The spigot 3, the socket 4 and the pipes 11, 12 are all made of an aluminum alloy.

As shown in FIG. 2, the socket 4 is fixed to the forward end of the pipe 12 by crimping, and the bearing portion 4b is provided by a flange 12a of the pipe 12. The apertures 5 are elongated, and bridge portions 4c are formed between the apertures 5.

The socket 4 may be integral with the forward end of the pipe 12 instead of being a member separate from the pipe 12 as described above.

As shown in FIGS. 1 and 2, the embracing portion 10a of the stopper 10 has a width greater than the distance L between the two sides 5a, 5b of the aperture 5 perpendicular to the axis, and the ridges 7a are positioned closer toward one axial end than the other.

Figure 5:
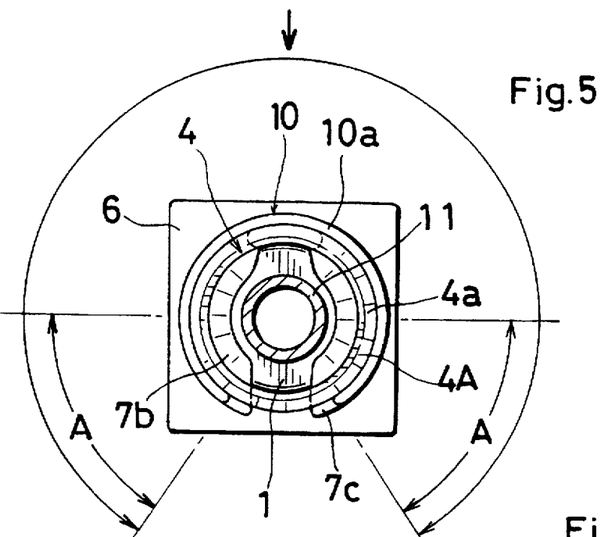
FIG. 5 is a right side elevation showing the stopper as mounted in position.
Figure 6:
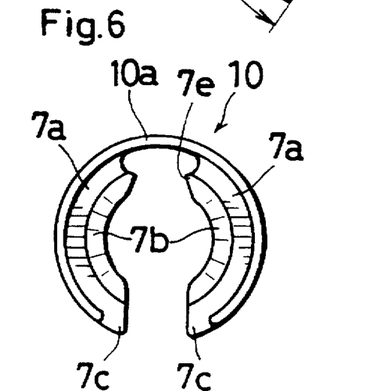
FIG. 6 is a right side elevation of the stopper.
Figure 7:
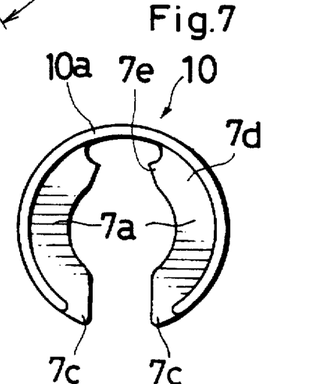
FIG. 7 is a left side elevation of the stopper.

The embracing portion 10a of the stopper 10 of the present embodiment is C-shaped. As seen in FIG. 5, the embracing portion 10a is satisfactory insofar as it is so shaped that when the stopper 10 is mounted on the cylindrical portion 4A of the socket 4, the respective parts marked A of the embracing portion 10a, which are beyond 180° from the mounting direction (indicated by an arrow), are at least in a circular-arc form so as to extend along the outer periphery of the cylindrical portion 4A.

With the pipe joint of the present embodiment, the spigot 3 is inserted into the socket 4, with the stopper ridges 7a fitted in the respective apertures 5 of the socket 4, whereby the annular projection 1 of the spigot 3 is caused to advance inwardly of the socket 4 along the slopes 7b of the ridges 7a while moving the opposed ridges 7a away from each other against the resiliency of the stopper 10. The annular projection 1 of the spigot 3 then moves past the ridges 7a to come into contact with the bearing portion 4b on the peripheral wall inner surface of the socket 4, whereupon the ridges 7a of the stopper 10 return toward each other by virtue of the resiliency. Consequently, the annular projection 1 of the spigot 3 is fixedly held between the bearing portion 4b of the socket 4 and the engaging faces 7d of the stopper ridges 7a. The spigot 3 and the socket 4, thus engaged, join the pipe 11 to the pipe 12.

In mounting the stopper 10 on the socket 4, the circular-arc ridges 7a can be smoothly fitted into the respective apertures 5 merely by fitting the extensions 7c of the ridges 7a into the upper end portions 5c of the socket apertures 5 first and sliding the extensions 7c toward the lower ends 5d of the apertures 5.

The embracing portion 10a of the stopper 10 are C-shaped and has a great width about twice the distance L between the two sides 5a, 5b of the socket aperture 5 which are perpendicular to the axial direction. When the stopper 10 is mounted on the socket 4 by fitting the ridges 7a which extend from inside the embracing portion 10a into the socket apertures 5, the embracing portion 10a therefore embraces the peripheral wall 4a of the socket cylindrical portion 4A approximately over the entire circumference thereof as shown in FIG. 5. Accordingly, the stopper 10 can be mounted on the outer periphery of the cylindrical portion 4A with good stability. In the case where the pipe joint of the present embodiment is used for the piping for the evaporator, etc. of a motor vehicle air conditioner, the socket 4 will be shaken with the vibration involved in the travel of the motor vehicle. In this case, the stopper 10 embracing the cylindrical portion 4A of the socket 4 moves with the socket 4 in intimate contact with the outer periphery of the cylindrical portion 4A and therefore will not slip off from the socket 4.

In addition, the stopper 10 of the embodiment has incorporated therein glass fiber for reinforcing nylon 66 and nylon 610; is accordingly excellent in toughness and heat resistance; and is resistant to, or durable against, oils and many chemicals. In the case where the present pipe joint is used for connecting pipes for the condenser, receiver, etc. of the air conditioner, which are arranged in the engine space of a motor vehicle, calcium chloride, or like metal halide, for use as antifreezing agent for roads is likely to adhere to the stopper 10. Even in such a case, the stopper 10 remains free of cracking due to deterioration; retains high strength at all times; and is in any way unlikely to slip off.

The embracing portion 10a of the stopper 10 is formed with an engaging groove 10b in its opposite sides except at its central part.

As an assembling error-preventing structure, the stopper 10 of the present embodiment has an assembling error-preventing flange 10d at the pipe (11) insertion side of the circular-arc ridges 7a. When the stopper 10 is to be mounted on the socket 4 with the slopes 7b of the ridges 7a oriented in a direction opposite to the pipe 11 to be inserted, the flange 10c of the stopper 10 comes into contact with a protrusion 6 which is provided externally on the socket 4.

The stopper 10 is mounted on the cylindrical portion 4A of the socket 4. The protrusion 6 is a rectangular parallelepiped having a contour larger than the outside diameter of the cylindrical portion 4A.

The assembling error-preventing flange 10d is C-shaped. The stopper 10 has at the other side of the ridges 7a opposite to the flange 10d a flange 10c having a smaller width than the flange 10d. This flange 10c of smaller width and the error-preventing flange 10d constitute the embracing portion 10a. In other words, the ridges 7a are provided on the embracing portion 10a internally thereof as positioned closer to one side.

As previously stated, the apertures 5 of the socket 4 each have two sides 5a, 5b perpendicular to the axis of the socket, and the stopper embracing portion 10a has a large width of about twice the distance L between the two sides 5a, 5b.

In the case where the stopper 10 is to be mounted in the proper position, i.e., with the slopes 7b of the ridges 7a facing toward the pipe 11 to be inserted, the narrow flange 10c of embracing portion 10a of the stopper 10 does not come into contact with the protrusion 6 provided externally on the socket 4. Consequently, the ridges 7a of the stopper 10 are fitted into the respective apertures 5 of the socket 4, whereby the stopper 10 is installed in place.

Figures 20, 21:
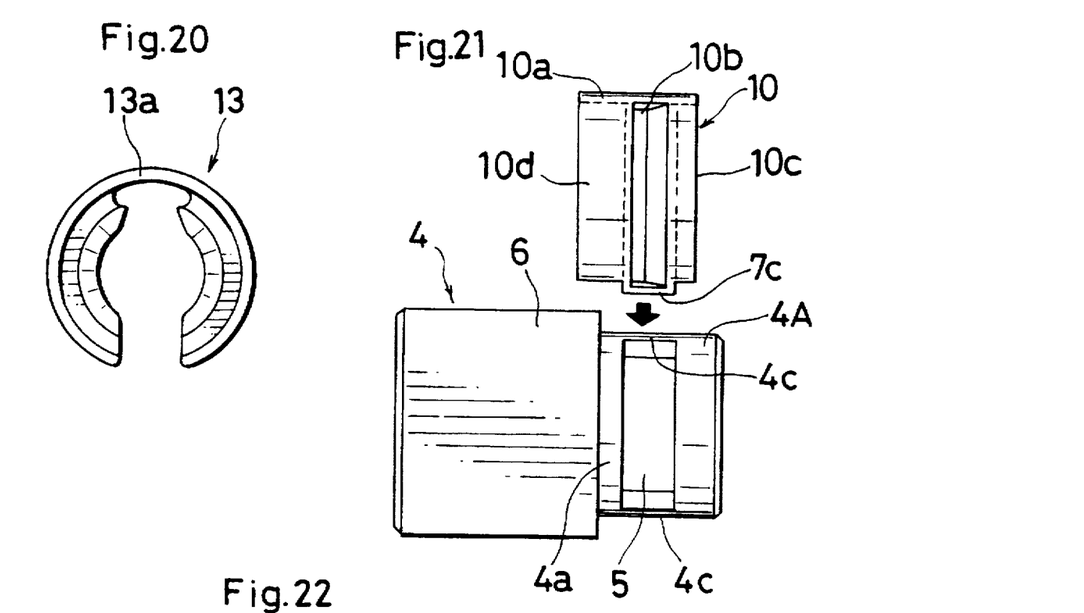
FIG. 20 is a right side elevation showing a stopper having an increased wall thickness and embodying the invention.
FIG. 21 is a front view showing the stopper when it is to be mounted as oriented in the opposite direction.

On the other hand, when the stopper 10 is to be mounted in an erroneous state, i.e., with the slopes 7b oriented in a direction opposite to the pipe 11 to be inserted, the assembling error preventing flange 10d of embracing portion 10a of the stopper 10 comes into contact with the protrusion 6 provided externally on the socket 4 before the ridges 7a are fitted into the socket apertures 5 as shown in FIG. 21. This reliably prevents the stopper 10 from being mounted improperly.

FIGS. 8 to 19 show another embodiment, i.e., a stopper 10A having no engaging groove 10b in the outer periphery of its embracing portion 10a unlike the above embodiment. Like the stopper 10, the stopper 10A can be mounted on the socket 4 with good stability.

Throughout the drawings showing the embodiments, like parts are designated by like reference numerals or symbols.

Figure 8:
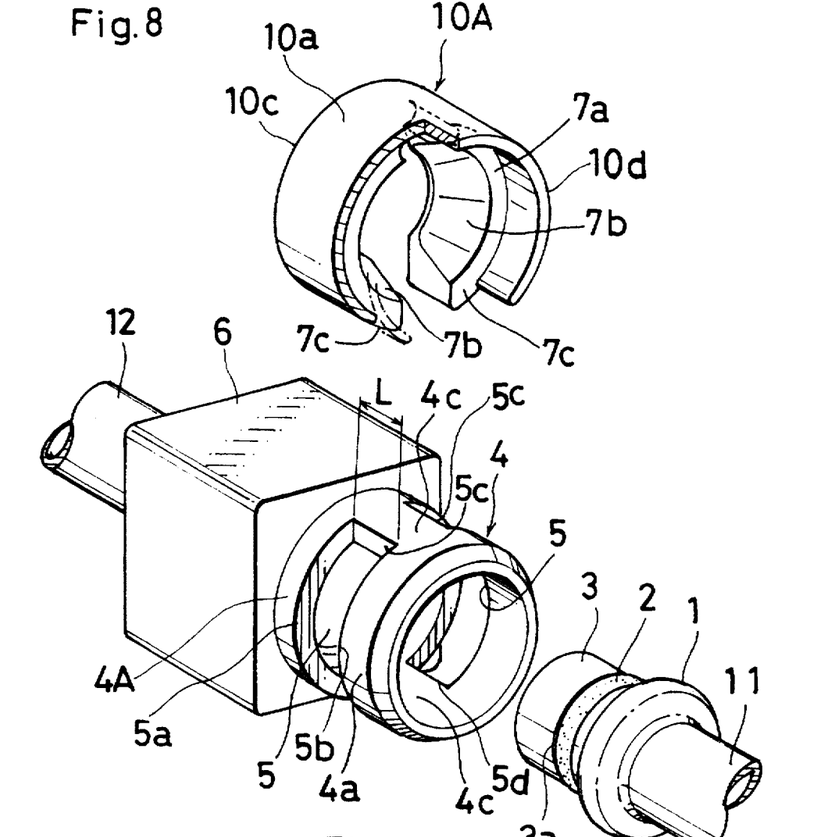
FIG. 8 is a perspective view showing another embodiment of the pipe joint of the invention.
Figure 9:
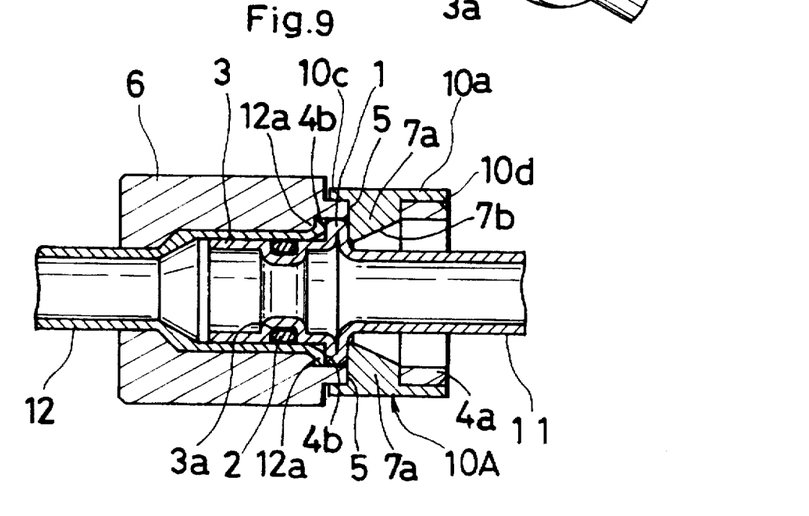
FIG. 9 is a view in horizontal section showing two pipes as joined to each other by the pipe joint of FIG. 8.
Figure 10:
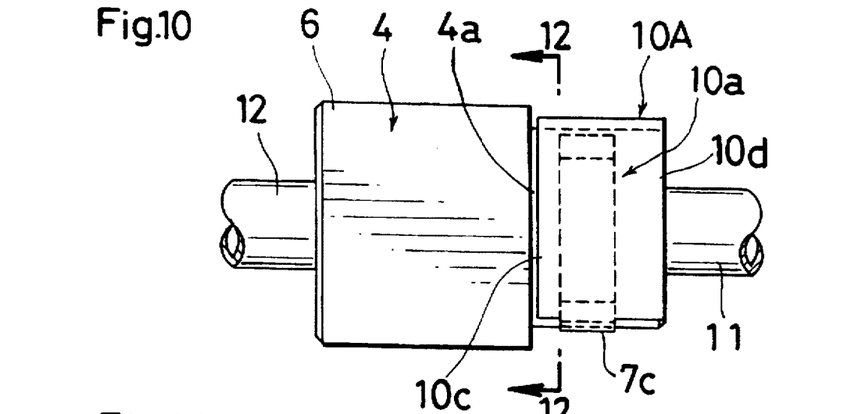
FIG. 10 is a front view showing the pipes joined by the pipe joint of FIG. 8.
Figure 11:
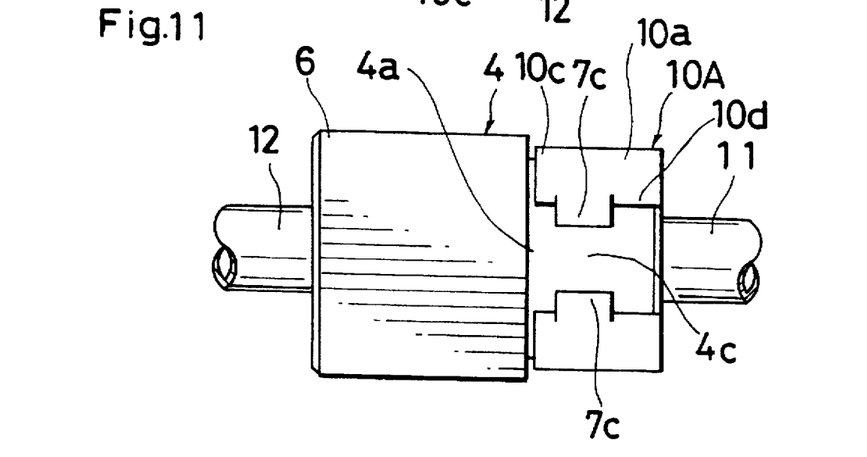
FIG. 11 is a bottom view showing the pipes as joined to each other similarly.

Like the first embodiment, the stopper 10A can be mounted stably as will be described below in detail.

Figure 12:
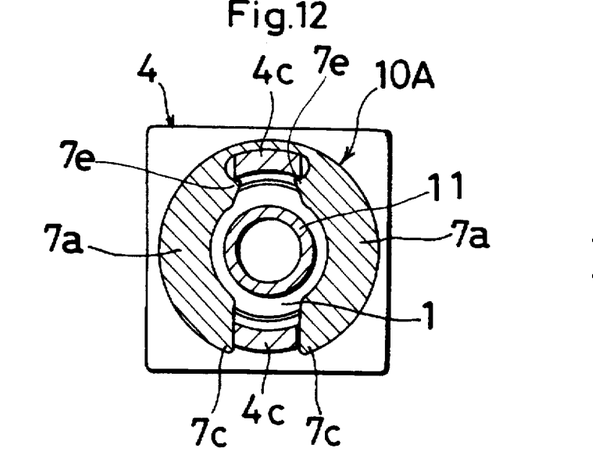
FIG. 12 is a view in section taken along line 12—12 in FIG. 10.
Figure 13:
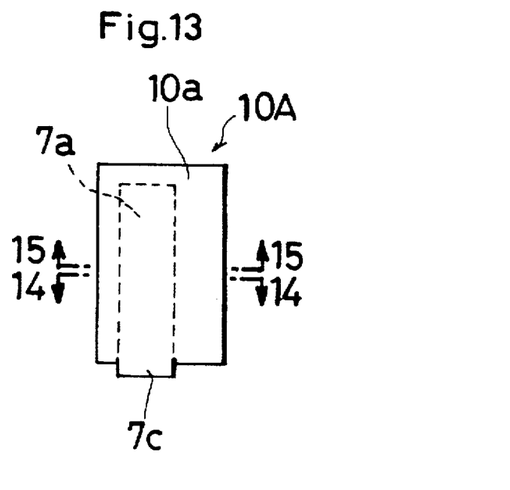
FIG. 13 is a front view of a stopper in the pipe joint of FIG. 8.
Figure 14:
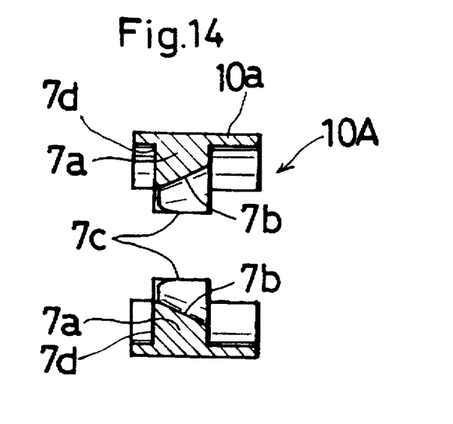
FIG. 14 is a view in section taken along the line 14—14 in FIG. 13.
Figure 15:
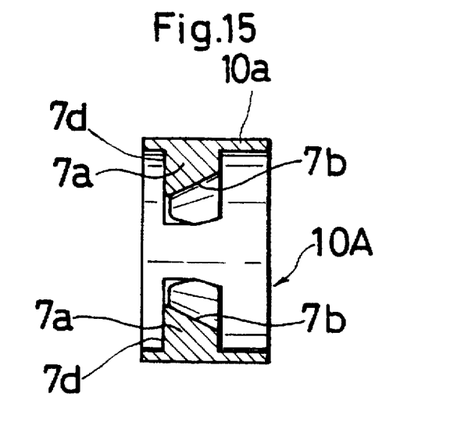
FIG. 15 is a view in section taken along the line 15—15 in FIG. 13.
Figure 16:
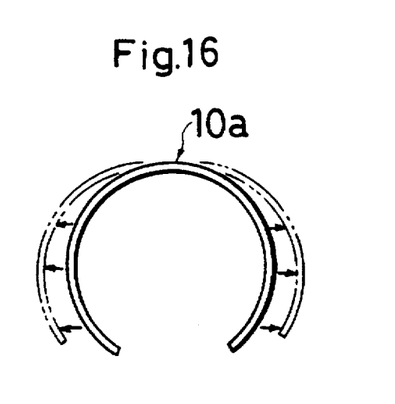
FIG. 16 is a side elevation showing an embracing portion only of the stopper.
Figure 17:
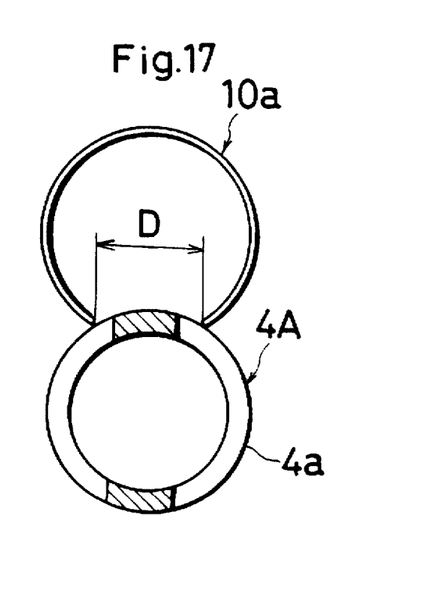
FIG. 17 is a side elevation showing the embracing portion of FIG. 16 before it is mounted on a socket.
Figure 18:
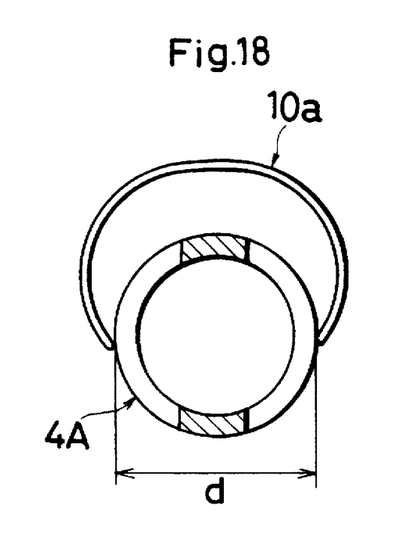
FIG. 18 is a side elevation showing the embracing portion of FIG. 16 while it is being mounted on the socket.
Figure 19:
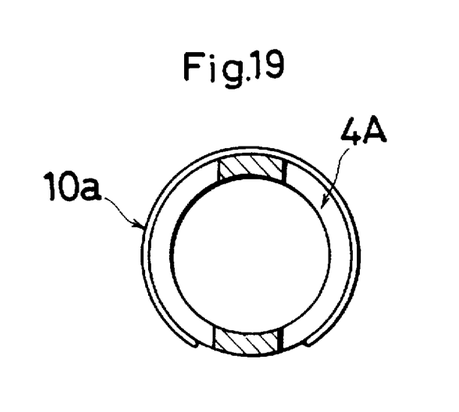
FIG. 19 is a side elevation showing the embracing portion of FIG. 16 as mounted on the socket.

As shown in FIG. 12, the engaging portions 7e of the opposed ridges 7a of the stopper 10A are engaged with the bridge portion 4c of the socket 4.

The stopper is eventually mounted in place in the following manner in addition to the engagement of the engaging portions 7e of the ridges 7a. When the stopper 10A is to be mounted on the socket 4 as shown in FIGS. 16 to 19, the stopper embracing portion 10a comes into contact the peripheral wall 4a of cylindrical portion 4A of the socket 4 and is elastically deformed by being pushed open by the wall 4a, with the opening width D of the opposite ends of the embracing portion 10a altered to a width d corresponding to the diameter of the cylindrical portion 4A. For the stopper to slip off from the mounted position, a force is needed to elastically deform the stopper embracing portion 10a from the width D to the width d corresponding to the diameter of the portion 4A a required for mounting. This eliminates the likelihood of the stopper slipping off, for example, owing to vibration. Furthermore, since the stopper embracing portion 10a assumes a form embracing the cylindrical portion 4A of the socket 4, the stopper in its entirety has an increased engagement allowance relative to the socket 4.

FIG. 20 shows another embodiment of a stopper for use in the pipe joint of the present invention. The stopper 13 has basically the same shape as the stopper 10 of the embodiment described, but the embracing portion 13a has a larger wall thickness than the embracing portion 10a of the stopper 10 and is made of nylon 66.

For the durability test, a fluid was forced into the pipes connected together by the pipe joint, repeatedly 150.000 times, and the joint was checked for fluid tightness and deformation. The joint was evaluated as being satisfactory when free of leakage of the fluid and deformation or as being unacceptable when developing at least one of these faults.

The tests were conducted at a temperature of 120° C. to simulate the internal temperature of the engine room of the motor vehicle during driving.

The test conditions and results are listed in the following table, in which the blank circular mark means "satisfactory," and the cross mark "unacceptable."

TABLE

| TEST NUMBER | 1 | 2 | 3 | 4 |
| --- | --- | --- | --- | --- |
| TYPE | EMBODIMENT 1 | EMBODIMENT 2 | COMP. EX. 1 | COMP. EX. 2 |
| STOPPER |  |  |  |  |
| GEOMETRICAL MOMENT OF INERTIA ($mm^4$) | 167 | 296 | 29 | 26 |
| FEM DISPLACEMENT (At least 0.25 mm) | ○ | ○ | x | x |
| TENSILE STRENGTH (At least 725.5N) | ○ | ○ | x | x |
| DURABILITY (150,000 repetitions) | ○ | ○ | x | x |

The stopper 10 of FIG. 1 and the stopper 13 of FIG. 20 for use in the pipe joint of the invention, and stoppers of pipe joints of Comparative Examples 1 and 2 to be described below were tested for geometrical moment of inertia, displacement by the finite element method, tensile strength and durability. These tests will be described below.

The pipe joint of Comparative Example 1 is the conventional one previously described with references to FIGS. 34 and 35. The pipe joint of Comparative Example 1 has substantially the same construction except for the stopper 38 which differs from the stoppers 10 and 13 of FIGS. 1 and 20.

The pipe joint of Comparative Example 2 is the conventional one previously described with reference to FIGS. 30 and 31.

The stoppers of Comparative Examples 1 and 2 are both made of nylon 66.

The geometrical moment of inertia is relative to a widthwise load on the stopper. The displacement by the finite element method (FEM displacement) was evaluated as being satisfactory when up to 0.25 mm or as being unacceptable when exceeding 0.25 mm.

For the tensile strength test, the pipes connected together by the pipe joint to be tested were pulled by a tensile strength tester in directions opposite to each other and checked for the separation of the pipes. In this case, the tensile strength required of the pipe joints of the type described was evaluated as being satisfactory when not lower than 725.5 N (74 kgf) or as being unacceptable when lower than this value.

The test results given in the table reveal that the stopper 10 of FIG. 1 and the stopper 13 of FIG. 20 according to the invention are higher in geometrical moment of inertia, smaller in displacement, higher in tensile strength and more excellent in durability than the stoppers of Comparative Examples 1 and 2.

Figure 22:
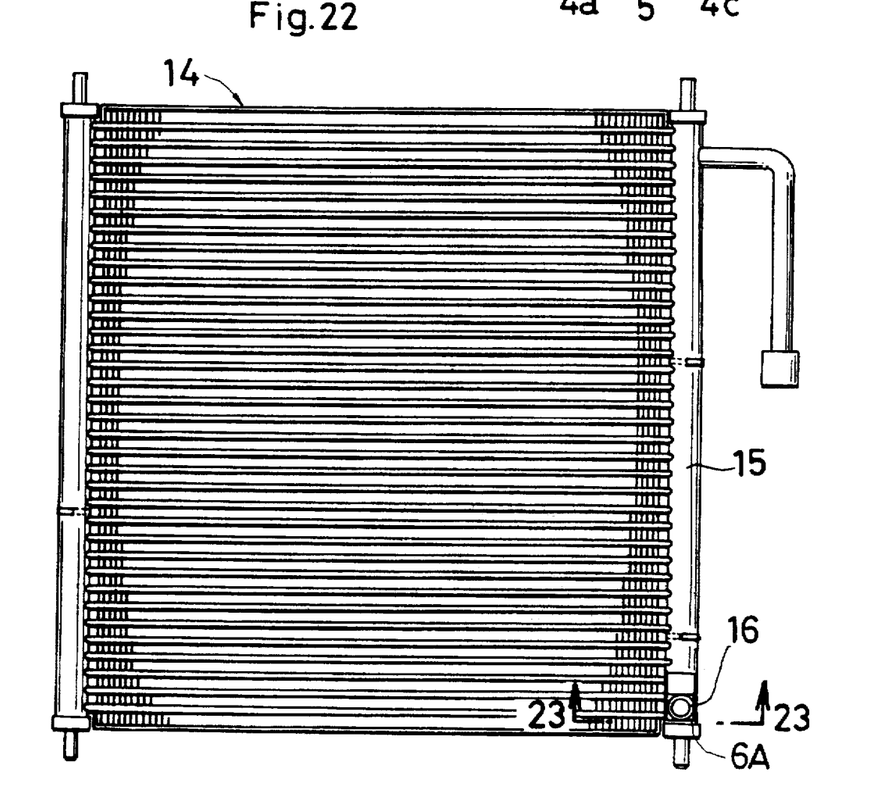
FIG. 22 is a front view showing a pipe joint of the invention as used for joining a pipe to a condenser.
Figure 23:
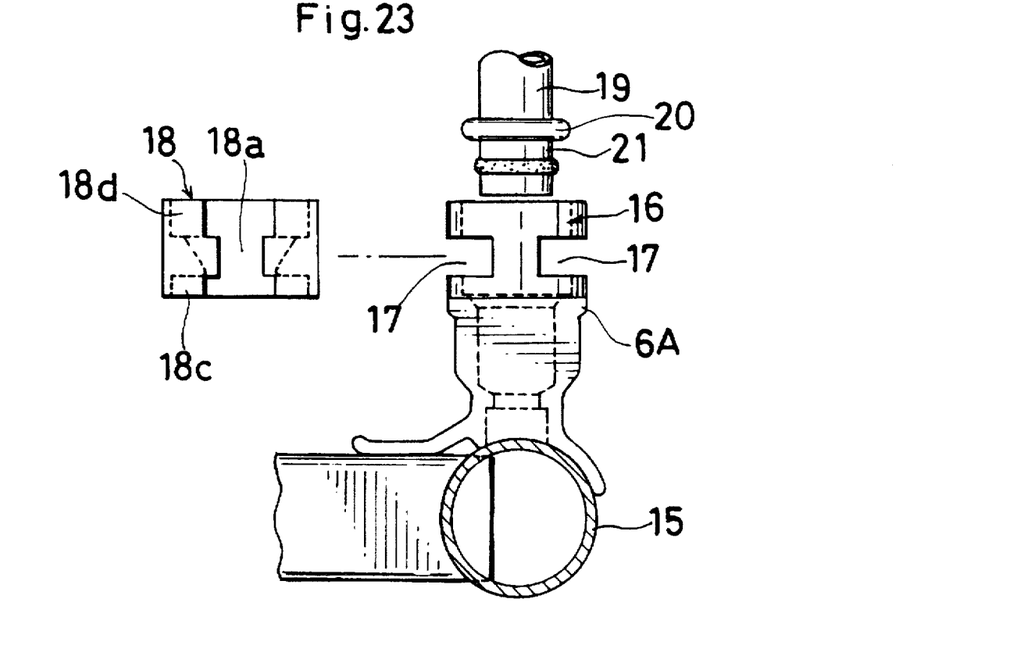
FIG. 23 is a view in section taken along the line 23—23 in FIG. 22 to show the relation between the pipe to be jointed and a stopper.

FIGS. 22 and 23 show a pipe joint of the invention as used for connecting an outlet pipe to the header of a motor vehicle condenser.

Stated more specifically, a socket 16 is provided on the header 15 of a condenser 14, a stopper 18 is fitted in apertures 17 of the socket 16, and a spigot 21 having an annular projection 20 is provided on the connection end of an outlet pipe 19. The spigot 21 of the outlet pipe 19 is inserted in the socket 16 of the header 15 and fixed thereto by the stopper 18.

As an assembling error preventing structure of the present embodiment, a protrusion 6A is formed externally on the socket 16 for the condenser 14.

When the stopper 18 is to be mounted as oriented in a reverse direction, an assembling error preventing flange 18d of embracing portion 18a of the stopper 18 comes into contact with the protrusion provided externally on the socket 16. This reliably eliminates an error in mounting the stopper 18.

Figure 24:
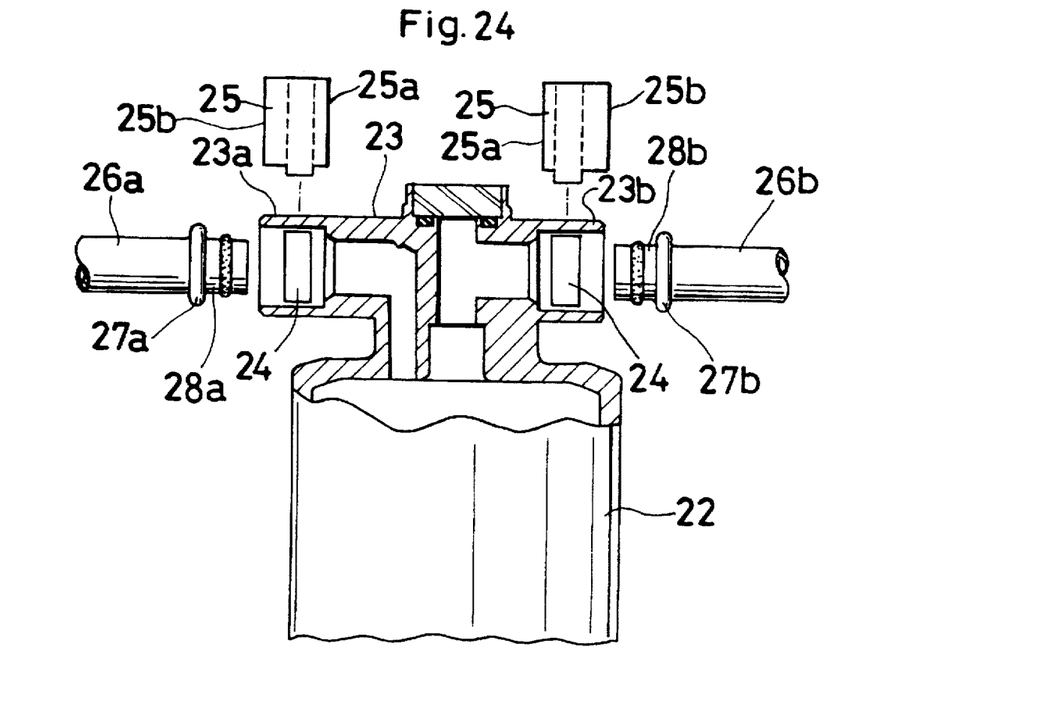
FIG. 24 is a fragmentary view in section showing pipe joints of the invention as used for joining pipes to a receiver.
Figure 25:
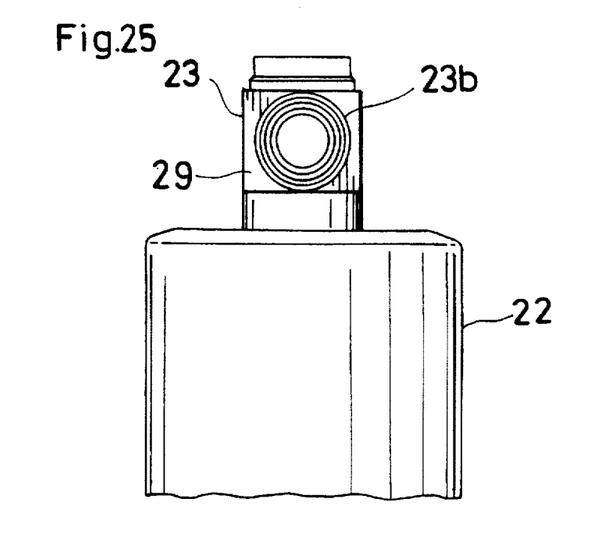
FIG. 25 is a side elevation of the receiver of FIG. 24.

FIGS. 24 and 25 show pipe joints of the invention as used for connecting a liquid inlet pipe and a liquid outlet pipe to the head of a receiver.

More specifically, sockets 23a, 23b are provided respectively at a liquid inlet portion and a liquid outlet portion of the head 23 of a receiver 22, a stopper 25 is fitted in apertures 24 of each of the sockets 23a, 23b, spigots 28a, 28b having an annular projection 27a or 27b are provided at the connection ends of a liquid inlet pipe 26a and a liquid outlet pipe 26b, respectively, and the spigots 28a, 28b of the pipes are inserted in the sockets 23a, 23b on the head 23 and fixed thereto each by the stopper 25. A protrusion 29 is formed externally on the sockets 23a, 23b at the inlet and outlet portions.

When the stopper 25 is to be mounted as properly positioned, a flange 25a of smaller width on the stopper 25 does not come into contact with the protrusion 29 of the socket 23a (23b), so that the stopper can be installed in place. On the other hand, when the stopper 25 is to be mounted as oriented reversely, an assembly error preventing flange 25b of the stopper 25 comes into contact with the protrusion 29 of the socket 23a (23b). This prevents the stopper 25 from being mounted as oriented reversely.

Figure 26:
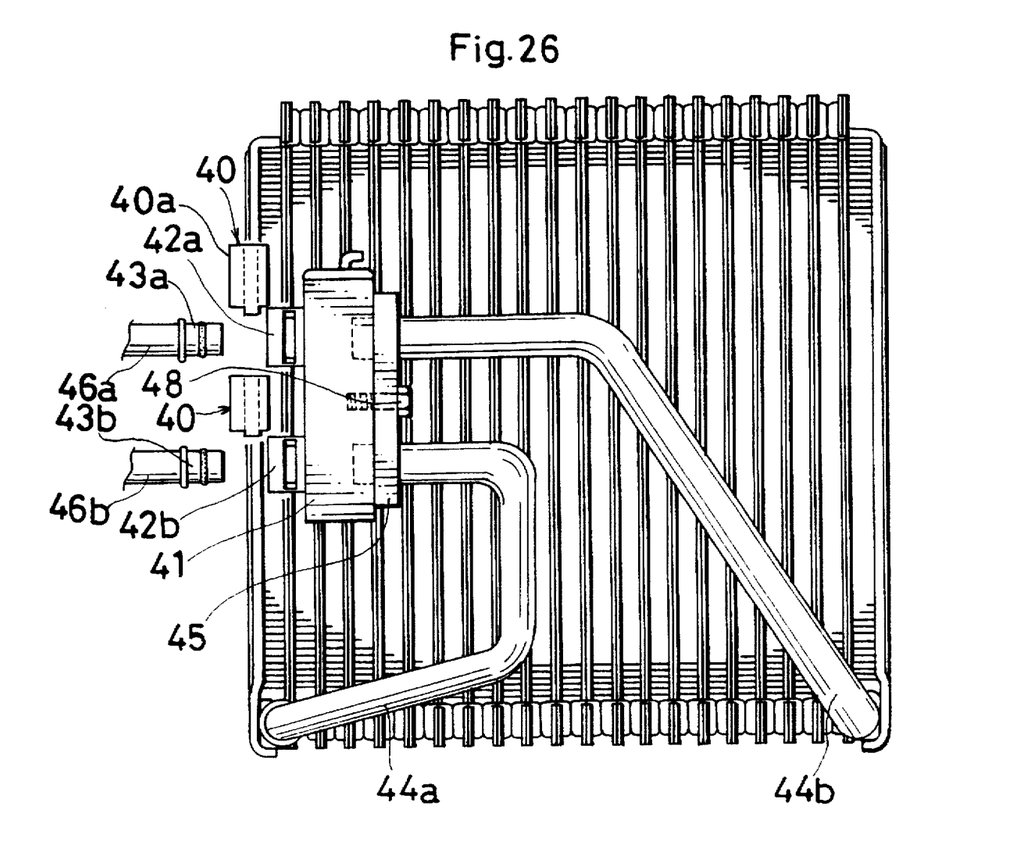
FIG. 26 is a front view showing pipe joints of the invention as used in piping for an evaporator.

FIG. 26 shows pipe joints of the invention as used for piping for an expansion valve on an evaporator. In this case, the expansion valve 41 of the block type is provided with two sockets 42a, 42b, and spigots 43a, 43b are provided at the connection ends of two refrigerant transport pipes 46a, 46b to be joined to the sockets 42a, 42b, respectively. An inlet pipe 44a and an outlet pipe 44b are connected to the expansion valve 41 by a mount flange 45. Indicated at 48 in the drawing is a fastening bolt for the mount flange.

When a stopper 40 is to be mounted in position as oriented reversely, an assembling error preventing flange 40a of the stopper 40 comes into contact with the block-type expansion valve 41, preventing mounting of the stopper 40. Thus, the expansion valve 41 itself serves as a protrusion for preventing the stopper 40 from being mounted as oriented reversely.

Figure 27:
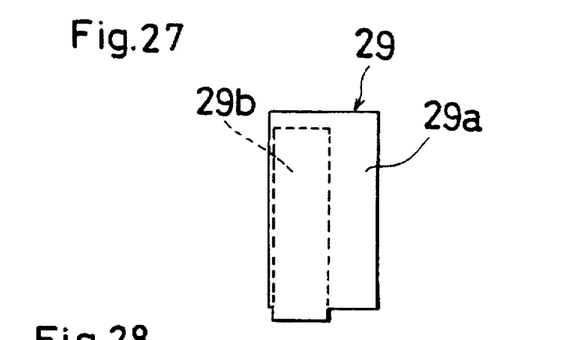
FIG. 27 is a front view showing another stopper embodying the invention.

FIG. 27 shows another embodiment of stopper for use in the pipe joint of the invention. Like the stopper 10 of the first embodiment, the embracing portion 29a of this stopper 29 is C-shaped and has a width larger than the distance L between the two sides of the aperture 5 of the socket 4 which are perpendicular to the axis of the socket. However, the stopper 29 has circular-arc ridges 29b which are formed at one side edge of the embracing portion 29a on its inner surface. Thus, the stopper 29 has an assembling error preventing flange 29c only.

Figure 28:
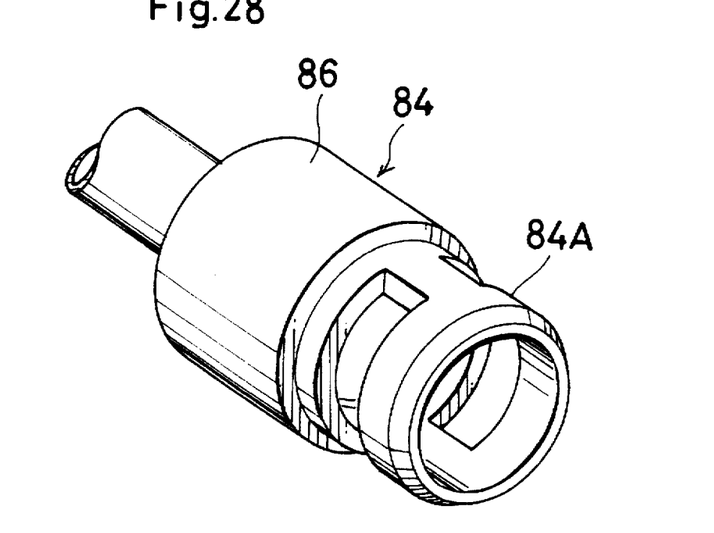
FIG. 28 is a perspective view showing a protrusion embodying the invention.

FIG. 28 shows a protrusion of another type providing an assembly error preventing structure according to the invention. A socket 84 has a cylindrical portion 84A of small diameter positioned toward the forward end thereof, and a protrusion 86 in the form of a cylinder of large diameter formed at the base end of the small-diameter cylindrical portion 84A integrally therewith. With the exception of this feature, the structure is the same as in the first embodiment.

The assembling error preventing structure of this embodiment has the same effect as in the first embodiment. When the stopper is to be mounted as oriented reversely, the error preventing flange of embracing portion of the stopper comes into contact with the cylindrical protrusion 86 of large diameter provided on the socket 84, preventing mounting of the stopper.

Figure 29:
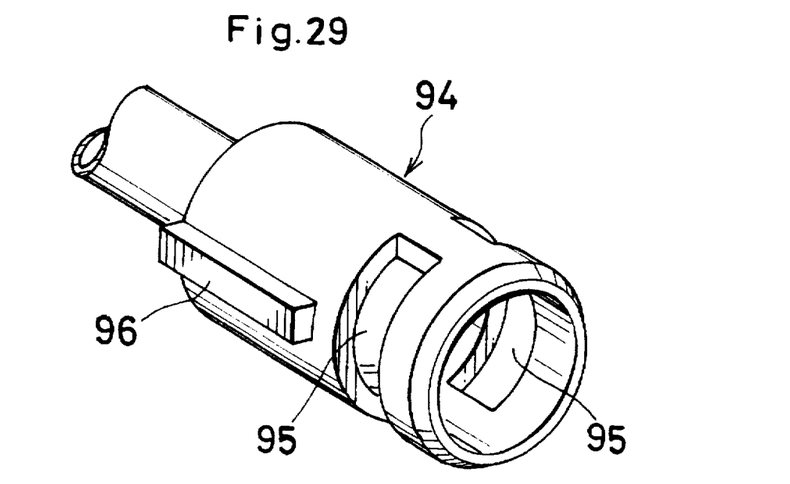
FIG. 29 is a perspective view showing another protrusion embodying the invention.

FIG. 29 shows a protrusion of another type according to the invention. A socket 94 formed with apertures 95 is in the form of a cylinder having a uniform diameter in its entirety, and the base end portion of the cylindrical socket 94 is locally provided with a protrusion 96 on the outer surface thereof. The structure is the same as in the first embodiment with the exception of this feature.

When the stopper is to be mounted as oriented reversely, the error preventing flange of embracing portion of the stopper comes into contact with the local protrusion 96 on the socket 94 as in the foregoing embodiments, preventing mounting of the stopper.

As a modification of the present embodiment, the local protrusion 96 may alternatively be formed on the outer surface of a forward end portion of the cylindrical socket 94. More specifically stated, the forward end portion of the cylindrical socket 94 beyond its apertures 95 is given a larger length, and the protrusion 96 is formed on this enlarged portion, while the assembling error preventing flange of the stopper is provided on the one side thereof opposite to its insertion side for receiving the pipe to be inserted. As a further modification of the present embodiment, the protrusion is provided in the form of a flange at the connection end of the socket in place of a local one.

In any of the foregoing embodiments of the present invention, the socket is cylindrical, and the stopper embracing portion has a circular-arc shape, whereas the socket may have a polygonal form, with the stopper embracing portion shaped in conformity with the form of the socket.

What is claimed is:

1. A pipe joint comprising a pipe having a spigot formed with an annular projection on an outer periphery of an end portion of said pipe, a member having a socket including a tubular portion for receiving said spigot therein and formed with apertures in a peripheral wall of said tubular portion, said socket being internally formed with a bearing portion for receiving said annular projection of said spigot and for bearing on said annular projection when said spigot is inserted into said socket, and a resilient stopper having an embracing portion of an axial width extending greater than that of said apertures and so shaped that, when said stopper is mounted on said tubular portion of said socket, said axially extending embracing portion of said stopper extends along an outer periphery of said tubular portion, circular-arc ridges extending radially inwardly from said embracing portion and being fittable, respectively, in said apertures of said socket and for projecting radially inwardly thereof, and said annular projection of said spigot being fixedly positioned between said bearing portion and said circular-arc ridges of said stopper when said spigot is inserted into said socket.

2. A pipe joint as defined in claim 1 wherein said tubular portion of said socket is a cylinder, and said axially extending embracing portion of said stopper is in a circular-arc form.

3. A pipe joint as defined in claim 1 or 2 wherein said embracing portion of said stopper extends axially of said pipe and has opposite end portions which are shorter than end portions of said circular-arc ridges in a fitting-in direction of said circular-arc ridges.

4. A pipe joint as defined in claim 3 wherein said embracing portion is C-shaped for concentrically embracing said tubular portion of said socket.

5. A pipe joint as defined in claim 3 wherein said circular-arc ridges of said stopper each have a slope on a side of said stopper toward the pipe to be inserted for receiving said spigot, and an engaging face on a side thereof opposite said slope for engaging said annular projection of said pipe when said pipe is inserted into said socket and said annular projection has passed said slope.

6. A pipe joint as defined in any one of claims 1 or 2 wherein said embracing portion is C-shaped for embracing said tubular portion of said socket.

7. A pipe joint as defined in claim 6 wherein said circular-arc ridges of said stopper each have a slope on a side of said stopper toward the pipe to be inserted for receiving said spigot, and an engaging face on a side thereof opposite said slope for engaging said annular projection of said pipe when said pipe is inserted into said socket and said annular projection has passed said slope.

8. A pipe joint as defined in any one of claims 1 or 2 wherein said circular-arc ridges of said stopper each have a slope on a side of said stopper toward the pipe to be inserted for receiving said spigot, and an engaging face on a side thereof opposite said slope for engaging said annular projection of said pipe when said pipe is inserted into said socket and said annular projection has passed said slope.

9. In a pipe joint comprising a pipe having a spigot formed with an annular projection on the outer periphery of an end portion of said spigot, a stopper having an axially extending embracing portion and circular-arc ridges extending radially inwardly from said embracing portion, said circular-arc ridges being each formed with a slope cooperating to define radially inwardly convergent surfaces for axially guiding said annular projection of said spigot, and an engaging face on a side opposite said slope for engaging said annular projection, and a socket having apertures for fitting said circular-arc ridges of said stopper in a radially inwardly projecting position in said socket, and an assembling error preventing structure for said stopper comprising a portion of said embracing portion defining a flange formed on said stopper at one side of said circular-arc ridges, and a protrusion on said socket for abutting said flange on said stopper and preventing said circular-arc ridges on said stopper from being inserted in said apertures of said socket when said slopes of said circular-arc ridges are disposed in a direction opposite that to engage a pipe being inserted in said socket.

10. An assembling error preventing structure as defined in claim 9 wherein said flange on said stopper is C-shaped.

11. An assembling error preventing structure as defined in claim 9 or 10 wherein said socket has a cylindrical portion for mounting said stopper thereon, and said protrusion on said socket is a rectangular parallelepiped having peripheral dimensions greater than an outside diameter of said cylindrical portion.

12. An assembling error preventing structure as defined in claim 9 or 10 wherein said socket has a cylindrical portion for mounting said stopper thereon, and said protrusion on said socket is a body portion formed as a cylinder of a diameter greater than that of said cylindrical portion for mounting said stopper.

13. An assembling error preventing structure as defined in claim 9 or 10 wherein said protrusion is a body portion formed on an outer surface of said socket and projecting radially outwardly therefrom.

14. An assembling error preventing structure as defined in claim 13 wherein said protrusion is provided on said socket at an axial side of said apertures opposite said pipe insertion side.

* * * * *

UNITED STATES PATENT AND TRADEMARK OFFICE
CERTIFICATE OF CORRECTION

PATENT NO. : 5,765,877
DATED : June 16, 1998
INVENTOR(S) : Sakane et al.

Page 1 of 1

It is certified that error appears in the above-identified patent and that said Letters Patent is hereby corrected as shown below:

Title page,
Item "[73] Honda Giken Kogyo Kabushiki Kaisha, Tokyo, Japan should be -- [73] Honda Giken Kogyo Kabushiki Kaisha, Tokyo, Japan; Showa Aluminum Corporation, Osaka, Japan --

Signed and Sealed this

Eighteenth Day of December, 2001

Attest:

Attesting Officer

JAMES E. ROGAN
Director of the United States Patent and Trademark Office